(12) United States Patent
Hitsman

(10) Patent No.: US 9,925,911 B2
(45) Date of Patent: Mar. 27, 2018

(54) STRAP WINDER AND CARRIER

(71) Applicant: John Hitsman, Ottawa (CA)

(72) Inventor: John Hitsman, Ottawa (CA)

(73) Assignee: 2204217 Ontario Inc., Ottawa (CA)

( * ) Notice: Subject to any disclaimer, the term of this patent is extended or adjusted under 35 U.S.C. 154(b) by 361 days.

(21) Appl. No.: 14/756,869

(22) Filed: Oct. 23, 2015

(65) Prior Publication Data

US 2017/0113597 A1    Apr. 27, 2017

(51) Int. Cl.
*B60P 7/08* (2006.01)
*B65H 54/58* (2006.01)
*B65H 75/16* (2006.01)

(52) U.S. Cl.
CPC .......... *B60P 7/0846* (2013.01); *B65H 54/585* (2013.01); *B65H 75/16* (2013.01); *B65H 2701/375* (2013.01); *B65H 2701/533* (2013.01)

(58) Field of Classification Search
CPC ..... B60P 7/0846; B65H 75/16; B65H 54/585; B65H 2701/375; B65H 2701/533
USPC ............................ 242/395, 588, 588.3, 532.6
See application file for complete search history.

(56) References Cited

U.S. PATENT DOCUMENTS

| 1,199,790 | A | * | 10/1916 | Holcomb | B65H 54/585 220/275 |
| 5,433,565 | A | * | 7/1995 | Chan | B60P 7/0853 16/422 |
| 6,179,534 | B1 | * | 1/2001 | Weckter | B60P 7/0846 242/395 |
| 6,729,604 | B1 | * | 5/2004 | Claycomb | B60P 7/0846 24/68 R |
| 2005/0145747 | A1 | * | 7/2005 | Breeden, III | B60P 7/0846 242/588 |
| 2017/0036885 | A1 | * | 2/2017 | Goodrich | B65H 75/30 |

FOREIGN PATENT DOCUMENTS

GB    2651735 A1 *  2/2010 ............ B60P 7/0853

* cited by examiner

*Primary Examiner* — William E Dondero
(74) *Attorney, Agent, or Firm* — George A. Seaby

(57) ABSTRACT

A tie down strap winder and carrier includes a basket for carrying a plurality of straps in side-by-side relationship to each other, a pocket on one end of the basket for storing a reel, which can be removed from the pocket and inserted into a socket in an outer end of the pocket and basket for receiving and winding a strap, and a slider for mounting on the reel to facilitate removal of a wound strap from the reel.

11 Claims, 8 Drawing Sheets

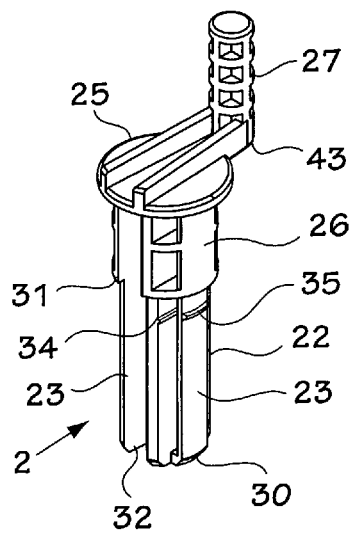
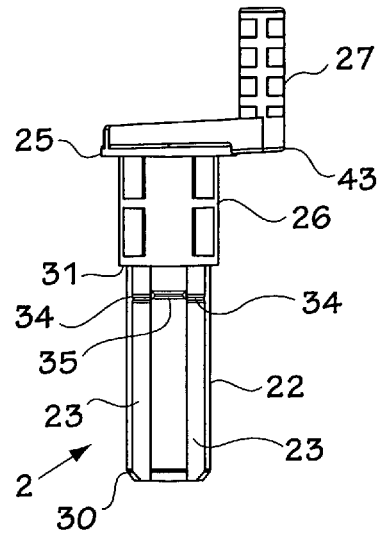
FIG. 9  FIG. 10
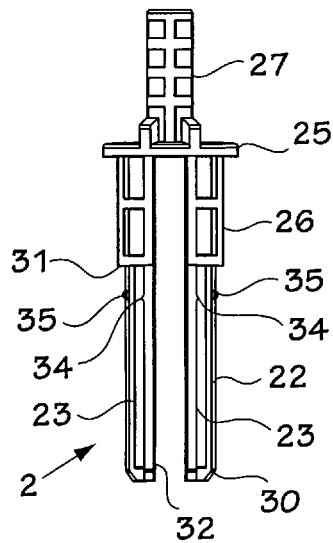
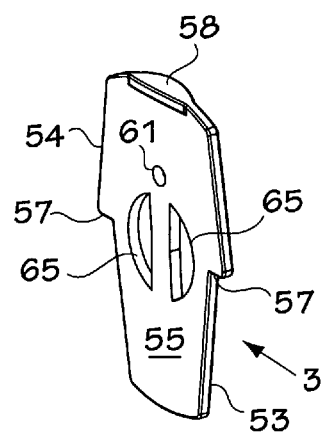
FIG. 11  FIG. 12

STRAP WINDER AND CARRIER

This invention relates to a strap winder and carrier.

While the apparatus of the present invention is primarily intended for winding and carrying ratchet tie down straps, it will be appreciated that the apparatus can be used to wind and carry virtually any type of strap or even string or short lengths of rope.

BACKGROUND OF THE INVENTION

Every year, hundreds of thousands if not millions of tie down straps are sold in North America. When not in use the tie down straps are commonly stored loose in the trunk of a car or in the back of a truck. The result is a messy bundle, which must be unraveled and straightened before being used again.

Canadian Patent Application No. 2,651,735 discloses a tie down dispenser for a single tie down strap. U.S. Pat. No. 1,199,790, issued to W. H. Holcomb on Oct. 3, 1916; U.S. Pat. No. 5,433,565, issued to Mee P. Chan on Jul. 18, 1995; U.S. Pat. No. 6,179,534, issued to Jerry R. Weckter on Jan. 30, 2001 and U.S. Pat. No. 6,729,604, issued to Kenneth D. Claycomb on May 4, 2004 disclose a variety of strap or tape winding carrying apparatuses, all of which are intended to use with a single strap.

SUMMARY OF THE INVENTION

The strap winder and carrier of the present invention is a single, compact apparatus designed to carry a plurality of tie down or other straps. Specifically, the strap winder and carrier of the present invention includes a strap winder and carrier comprising a basket for receiving a plurality of wound straps in side-by-side relationship to each other; a pocket at one end of the basket; a reel for removable mounting in said pocket; a notch in the reel for receiving a strap to be wound onto the reel; a handle on one end of the reel for rotating the reel to wind the strap thereon; and a socket in one end of the basket and pocket for receiving a second end of the reel in preparation for a winding operation, whereby, following winding of the strap onto the reel, the reel can be removed from the socket, and the strap can be removed from the reel and placed in the basket for transportation and storage.

BRIEF DESCRIPTION OF THE DRAWINGS

The invention is described below in greater detail with reference to the accompanying drawings, wherein:

FIG. 9 is an isometric view of a reel used in the strap winder and carrier of FIGS. 1 and 2;

FIG. 10 is a side view of the reel of FIG. 9;

FIG. 11 is an end view of the reel of FIG. 9;

FIG. 12 is an isometric view of a strap guide fence used on the reel of FIGS. 9 to 11.

DETAILED DESCRIPTION OF THE INVENTION

Figure 1:
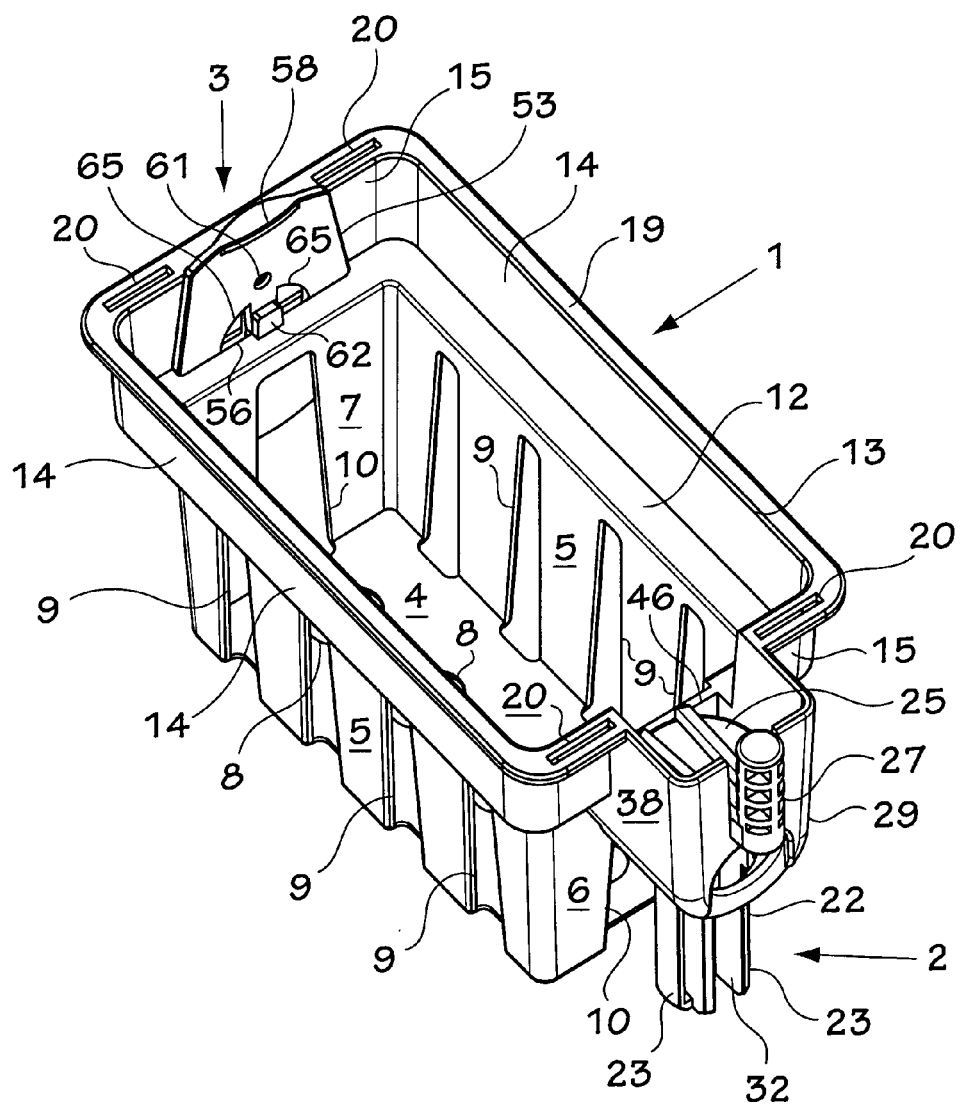
FIG. 1 is an isometric view of a preferred embodiment of the strap winder and carrier as seen from above and one end.
Figure 2:
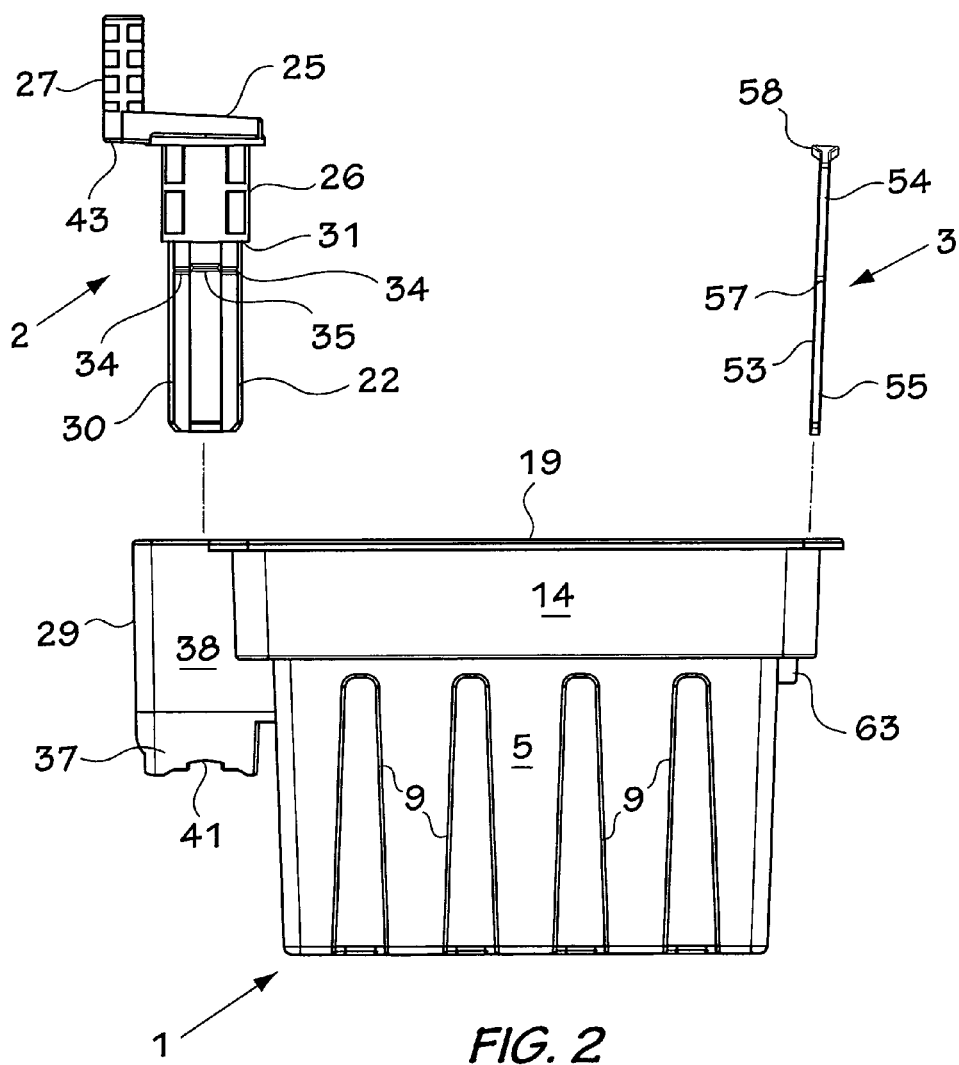
FIG. 2 is an exploded side view of the strap winder and carrier of FIG. 1.
Figure 3:
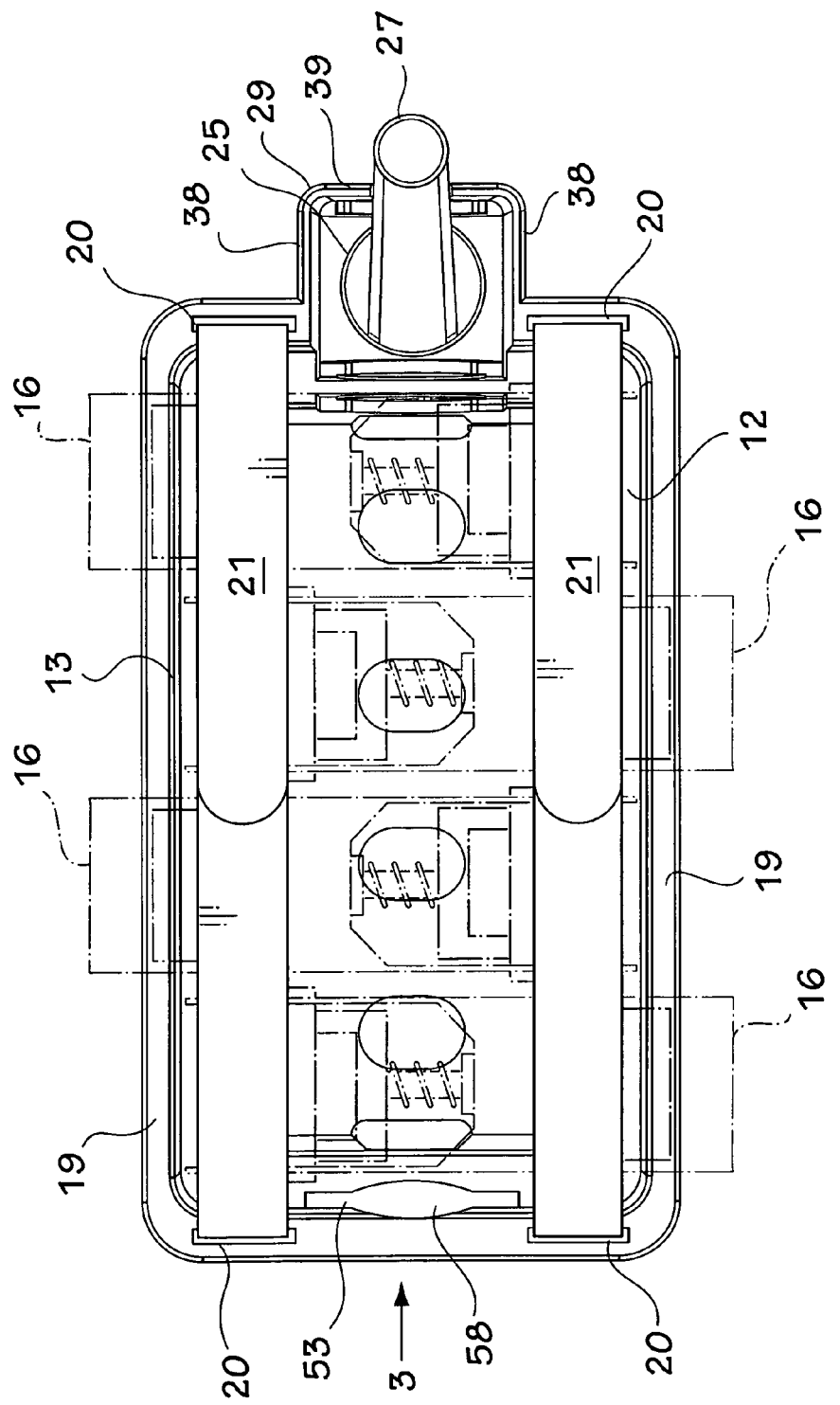
FIG. 3 is a top view of the strap winder and carrier of FIGS. 1 and 2 with four wound ratchet tie down straps loaded therein.

Referring to FIGS. 1 to 3, the three basic elements of the strap winder and carrier are a basket, a reel and a slider indicated generally at 1, 2 and 3, respectively.

Figure 13:
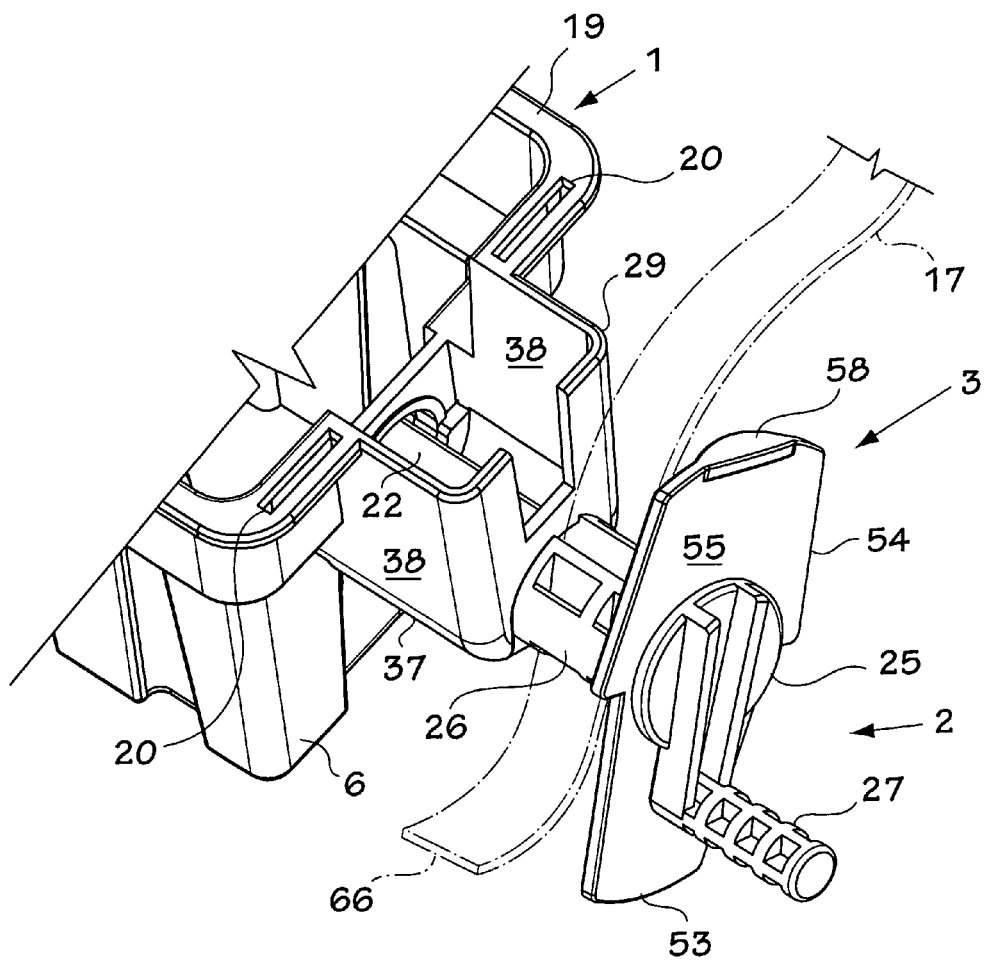
FIG. 13 is an isometric view of one end of the strap winder and carrier with a strap extending through the reel.

The basket 1, which is generally rectangular with rounded corners, includes a bottom wall 4, side walls 5 and end walls 6 and 7. Openings 8, 9 and 10 in the bottom wall 4, the side walls 5 and the end walls 6 and 7 respectively reduce the weight and quantity of material in the basket 1, and provide access to the interior of the basket. Fingers can be inserted through the openings to push straps out of the basket 1. A ledge 12 extends around the interior of the basket 1 close to the open top end 13 thereof. The ledge 12 extends outwardly to top ends 14 and 15 of the side and end walls 5, 6 and 7, respectively. As shown in FIG. 3, the ledge 12 supports the hardware 16 on one end of the tie down straps 17 (as shown in FIG. 13). A flange 19 extends outwardly around the open top end of the basket 1. Slots 20 in the ends of the flange 19 receive straps 21 (FIG. 3) for holding the tie down straps 17 in the basket 1. The straps 21 are provided with hook and loop (Velcro®) fasteners (not shown).

With reference to FIGS. 9 to 11, the reel 2 includes a bifurcated generally cylindrical body 22 defined by a pair of fingers 23 with a disc-shaped head 25 on one end 26 thereof. An L-shaped handle 27 on the head 25 is used to rotate the reel 2 in a pocket 29 on one end of the basket 1. The large diameter end 26 of the reel 2 adjacent the head 25 is connected to a smaller diameter end 30 by a shoulder 31. A notch 32 extends the entire length of the body 22 between the fingers 23 for receiving a strap 17 (FIG. 13). Transversely extending ridges 34 and 35 are provided on opposite sides of the body 22 a short distance from the shoulder 31 for releasably locking the reel 2 in the pocket 29.

Figure 5:
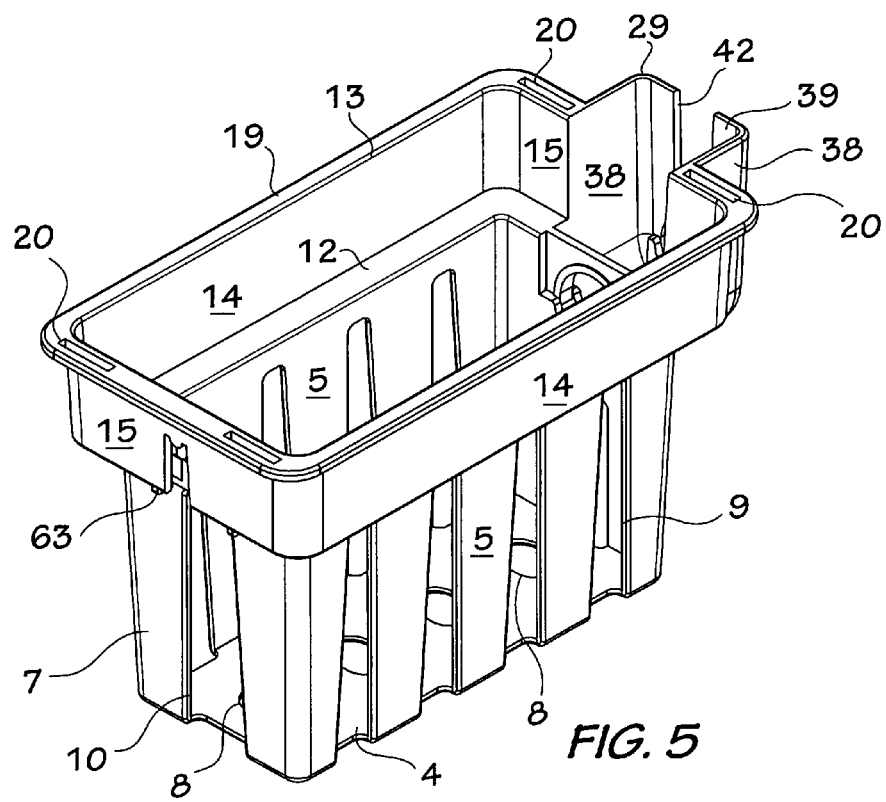
FIG. 5 is an isometric view of the strap winder and carrier as seen from the other end.
Figure 6:
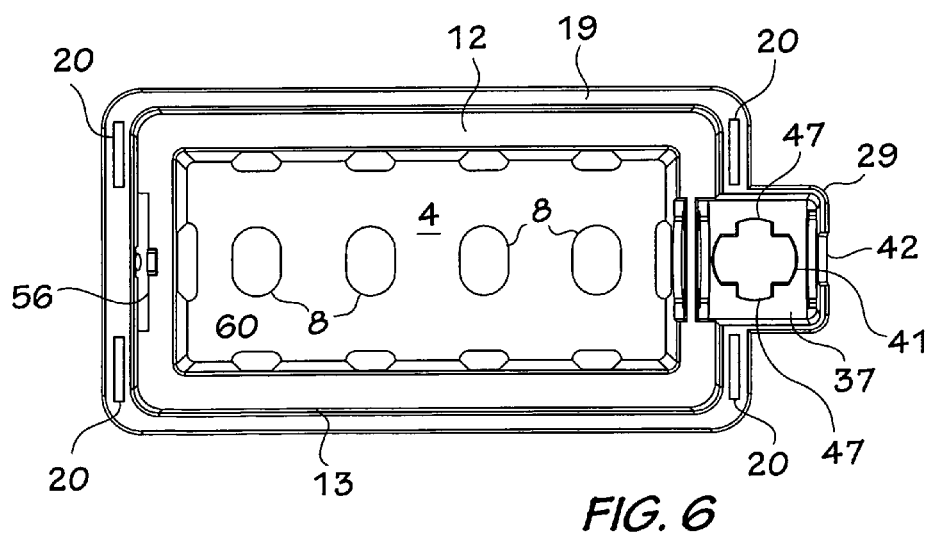
FIG. 6 is a top view of the strap winder and carrier of FIGS. 1 and 2 with parts removed.
Figure 8:
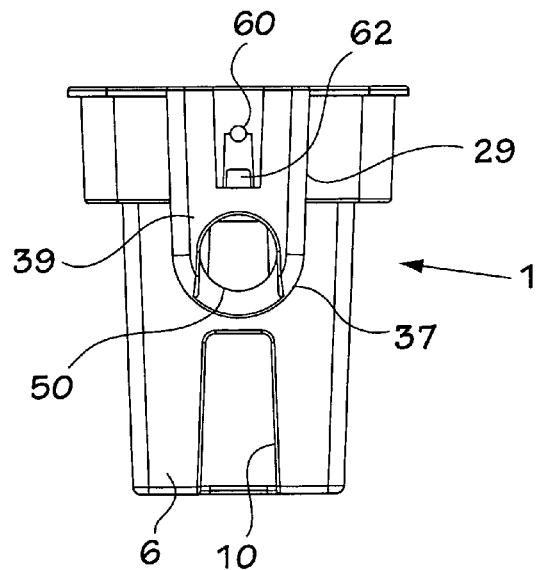
FIG. 8 is an end view of the strap winder and carrier of FIGS. 1 and 2 with parts removed.

The pocket 29, which extends outwardly from one end wall 6 of the basket 1, includes a semi-cylindrical bottom wall 37, side walls 38 and an outer end wall 39 (FIGS. 4, 5 and 8) spaced apart from the basket end wall 6. When not in use, the reel 2 is stored in the pocket 29. In the stored position, the end 30 of the reel 2 extends downwardly through a cruciform-shaped opening 41 (FIG. 6) in the bottom wall 37 of the pocket 29, and the handle 27 extends outwardly through a notch 42 (FIGS. 4 and 5) in the top of the pocket outer end wall 39. The bottom corner 43 of the handle 27 is seated on the bottom of the notch 42 in the outer end wall 39, and an edge of the head 23 rests on the bottom of a larger notch 46 in the end wall 6 of the basket 1. When the smaller diameter end 30 of the reel 2 is inserted into the opening 41 in the bottom wall 37 of the pocket 29, the ridges 34 snap through opposite arms 47 (FIG. 6) of the opening 41, whereby the reel 2 is releasably retained in the pocket 29. In the use position, the body 20 of the reel 2 is mounted in a socket defined by aligned holes 49 and 50 in the end wall 6 of the basket 1 and in the outer end wall 39 of the pocket 29, respectively. When the reel 2 is inserted into the socket, the ridges 35 snap into the hole 49 to releasably retain the reel in the socket.

Figure 4:
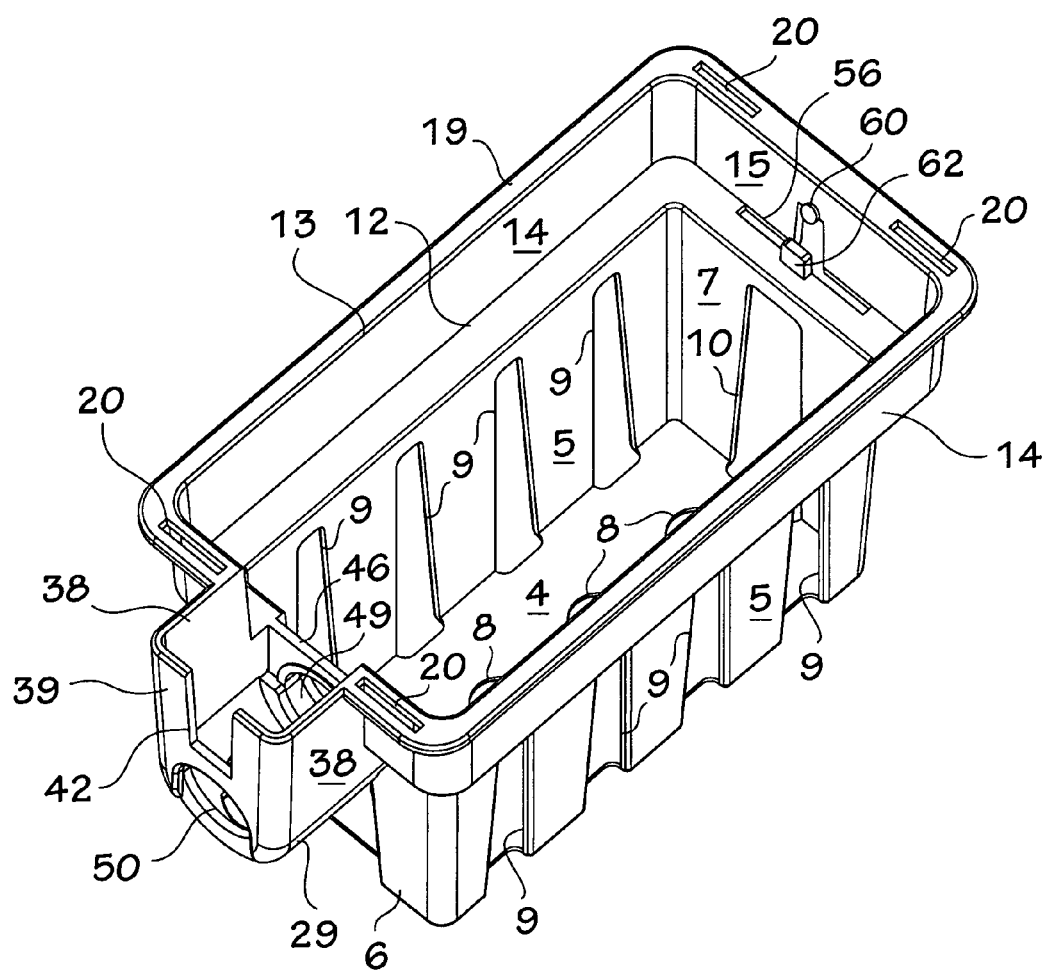
FIG. 4 is an isometric view of the strap winder and carrier as seen from one end with parts removed.
Figure 7:
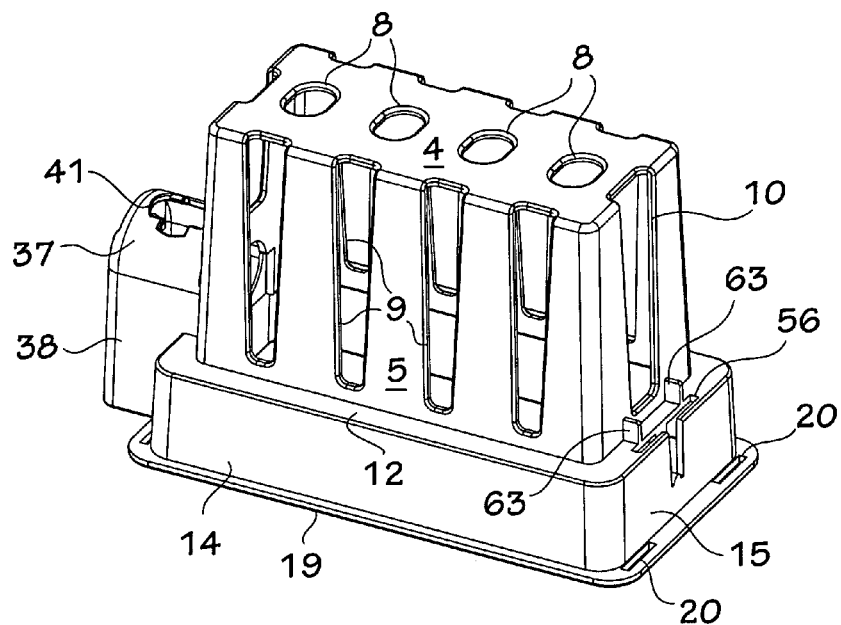
FIG. 7 is an isometric view of the strap winder and carrier as seen from below and one end.

As best shown in FIG. 12, the slider 3 includes an elongated, generally T-shaped body 53 with an upwardly tapering top end 54 and a narrower, downwardly tapering bottom end 55 for easy insertion of the slider into a slot 56 in the ledge 12 adjacent the upper end 15 of the basket end wall 7 (FIGS. 1, 4 and 7). When the slider 3 is in the slot 56, shoulders 57 between the top and bottom ends 54 and 55, respectively rest on the ledge 12 at the ends of the slot 56. An arcuate projection 58 at the top end of the body 53 facilitate manual manipulation of the slider 3. The slider 3 is retained in the slot 56 by a small pin 60 (FIG. 4) on the end wall 7 of the basket 1 above the slot 56 which extends into a hole 61 in the top end 54 of the slider. Wobbling of the slider 3 in the slot 56 is prevented by a small fence 62 on the ledge 12, and by a pair of fences 63 (FIGS. 2 and 7) extending downwardly from the bottom of the ledge 12 at the ends of the slot 56. A pair of openings 65 is provided in the body 53 of the slider 3. The openings 65 are slightly larger than and have the same shape (segments of circles) as the bottom ends 30 of the two fingers 23 of the reel 2.

With particular reference to FIGS. 2 and 13, in order to wind a tie down strap 17 onto the reel 2, the reel 2 is removed from the pocket 29 and the slider 3 is removed from the slot 56 by pulling gently inwardly against the fence 62 to release the slider from the pin 60 and then pulling upwardly. The slider 3 is slid onto the bottom end 30 of the reel 2 until it abuts the shoulder 31 and the reel is inserted into the holes 49 and 50 in the basket 1 and the pocket 29, respectively. The free end 66 of the strap 17 is threaded through the notch 32 between the fingers 23. If there is hardware such as a hook (not shown) on the end 66 of the strap 17, the strap is inserted into the notch 32 above the hardware before the reel 2 is inserted into the pocket 29 and the basket 1. By grasping the handle 27 and turning, the strap can be wound onto the reel 2. After winding has been completed, the reel 2, the slider 3 and the strap 17 are removed from the socket. The slider 3 is slid toward the small end of the reel 2 to dislodge the strap 17 from the reel. In the absence of the slider 3, when the strap 17 is wound tightly on the reel 2 it cannot be removed without pulling the wound center

The invention claimed is:

1. A strap winder and carrier comprising:
   a basket for receiving a plurality of wound straps in side-by-side relationship to each other;
   a pocket at one end of the basket;
   a reel for removable mounting in said pocket;
   a notch in the reel for receiving a strap to be wound onto the reel;
   a handle on one end of the reel for rotating the reel to wind the strap thereon; and
   a socket in one end of the basket and pocket for receiving a second end of the reel in preparation for a winding operation,
whereby, following winding of the strap onto the reel, the reel can be removed from the socket, and the strap can be removed from the reel and placed in the basket for transportation or storage.

2. The strap winder and carrier of claim 1, wherein said socket includes axially aligned holes in said one end of the basket and in an outer end wall of said pocket.

3. The strap winder and carrier of claim 2, wherein said pocket includes a bottom wall and an opening in said bottom wall for receiving said second end of said reel for storing the reel in the pocket.

4. The strap winder and carrier of claim 3, wherein said pocket includes a notch in the outer end wall for receiving the handle of the reel in a transporting or storage position.

5. The strap winder and carrier of claim 4, wherein said reel includes a bifurcated, cylindrical body, a disc-shaped head on one end of the body, and the handle being L-shaped and handle extending outwardly from one side of the head.

6. The strap winder and carrier of claim 5 further comprising a slider for mounting on said reel prior to insertion of the reel into the socket, the slider being slidable on the reel body for removing an intact, wound strap from the reel.

7. A strap winder and carrier comprising:
   a basket for receiving a plurality of wound straps in side-by-side relationship to each other including, a bottom wall, first and second side walls, first and second end walls and a plurality of openings in said bottom wall, side walls and end walls permitting access to the interior of the basket;
   a pocket on said first end of the basket;
   a reel for removable mounting in said pocket;
   a notch in the reel for receiving a strap to be wound onto the reel;
   a handle on one end of the reel for rotating the reel to wind the strap thereon; and
   a socket in the first end of the basket and an outer end of the pocket for receiving a second end of the reel in preparation for a winding operation,
whereby, following winding of the strap onto the reel, the reel can be removed from the socket and placed in the basket for transportation or storage.

8. The strap winder and carrier of claim 7, wherein said socket includes axially aligned holes in said one end of the basket and in an outer end wall of said pocket.

9. The strap winder and carrier of claim 8, wherein said pocket includes a bottom wall and an opening in said bottom wall for receiving said second end of said reel for storing the reel in the pocket.

10. The strap winder and carrier of claim 9, wherein said reel includes a bifurcated, cylindrical body, a disc-shaped head on one end of the body, and the handle being L-shaped and handle extending outwardly from one side of the head, and said pocket includes a notch in an outer end wall for receiving the handle of the reel in a transporting or storage position.

11. The strap winder and carrier of claim 10 further comprising a slider for mounting on said reel prior to insertion of the reel into the socket, the slider being slidable on the reel body for removing an intact, wound strap from the reel.

* * * * *